United States Patent
Pione

(12) 
(10) Patent No.: US 6,353,894 B1
(45) Date of Patent: Mar. 5, 2002

(54) POWER MANAGEMENT SYSTEM

(75) Inventor: Anthony E. Pione, Irvine, CA (US)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/288,272

(22) Filed: Apr. 8, 1999

(51) Int. Cl.[7] .................................................. G06F 1/26
(52) U.S. Cl. ....................................................... 713/340
(58) Field of Search ................................. 713/300, 340; 714/15, 24

(56) References Cited

U.S. PATENT DOCUMENTS

| | | | |
|---|---|---|---|
| 5,532,563 A | * | 7/1996 | Kodama et al. ............. 318/440 |
| 5,652,891 A | * | 7/1997 | Kitamura et al. ............ 713/324 |
| 5,742,579 A | | 4/1998 | Kazuno et al. |
| 5,905,994 A | * | 5/1999 | Hori et al. .................... 711/113 |
| 5,907,859 A | * | 5/1999 | Smimada et al. ............ 711/112 |

* cited by examiner

Primary Examiner—Glenn A. Auve
(74) Attorney, Agent, or Firm—Knobbe Martens Olson & Bear LLP

(57) ABSTRACT

An external storage device includes a power management system. The power management system comprises an energy storage circuit which stores energy from a power source and provides additional power to the external storage device. The external storage device further comprises a microcontroller which determines whether the combined power from the power source and the energy storage circuit is sufficient for the external storage device to perform a particular command received from a host computer. If the power from the power source and the energy storage circuit is insufficient, the microcontroller causes the external storage device to either suspend the command until sufficient energy is stored on the energy storage circuit to execute the command or execute the command at a rate slower than a normal rate.

28 Claims, 4 Drawing Sheets

POWER MANAGEMENT SYSTEM

BACKGROUND OF THE INVENTION

1. Field of the Invention

The present invention relates to external storage devices. Specifically, the present invention relates to a system for managing power in an external storage device, such as an optical disk drive.

2. Description of the Related Art

In a computer system, a host computer commonly sends read and/or write commands to an external storage device, which is commonly attached to the host computer system by a cable. One type of external storage device is an optical disk drive. An optical disk drive may derive its operating power (receive current) from an attached battery, or from the host computer via a universal serial bus (USB) which transfers data between the disk drive and the host computer. Optical disk drives typically require a relatively large surge of power to perform particular commands, such as seek, read, spin up or spin down. In some optical disk drive systems, the power from a particular power source may be insufficient at times for the optical disk drive to execute these commands. This may cause undesirable effects on system performance.

SUMMARY OF THE INVENTION

The present invention relates to a system for managing power in an external storage device, such as an optical disk drive. Optical disk drives typically require a relatively large surge of power to perform particular operations, such as seek, read, spin up or spin down. For example, the optical disk drive may require relatively large surges of power to control the movement of a spindle associated with an optical disk within the disk drive.

One aspect of the invention relates to an external storage device in communication with a host computer and a power source. The power source provides power to a motor driver within the external storage device. The external storage device comprises a microcontroller and an energy storage circuit, which is coupled to a line between the power source and the motor driver. The energy storage circuit stores energy from the power source and provides supplemental power to the motor driver. The microcontroller determines whether the power source and the energy storage circuit can provide sufficient power for the external storage device to properly execute a particular command received by the external storage device from the host computer. The microcontroller performs an operation according to a reduced power execution mode if the current from the power source and the energy storage circuit is insufficient for the external storage device to properly execute a particular command received from the host computer. In one embodiment, the microcontroller suspends the command until the energy storage circuit has stored sufficient energy for the external storage device to execute the command. In another embodiment, the microcontroller executes the command at a rate slower than a normal rate when there is sufficient power from the power source and the energy storage circuit. In yet another embodiment, the microcontroller can selectively performs one of the two operations, i.e., either suspending the command until the energy storage circuit has stored sufficient energy or executing the command at a rate slower than a normal rate.

Another aspect of the present invention relates to a method of managing power in an external storage device. The method comprises storing energy from a power source in an energy storage circuit within the external storage device. The method further comprises monitoring the amount of energy in the energy storage circuit when the external storage device receives a command from a host computer. Based on the act of monitoring, the method further comprises selectively performing an operation according to a reduced power execution mode when a combined current from the power source and the energy storage circuit is insufficient for the external storage device to properly execute a particular command from the host computer. In one embodiment, the microcontroller suspends the command until the energy storage circuit has stored sufficient energy for the external storage device to execute the command. In another embodiment, the microcontroller executes the command at a rate slower than a normal rate when there is sufficient power from the power source and the energy storage circuit. In yet another embodiment, the microcontroller can selectively performs one of the two operations, i.e., either suspending the command until the energy storage circuit has stored sufficient energy or executing the command at a rate slower than a normal rate.

Another aspect of the invention relates to an external storage drive for use with a computer. The external storage device comprises at least one motor which receives power from a primary power source over a power supply line, an energy storage circuit which receives energy from the primary power source and stores the energy to provide supplemental power to the at least one motor, and a microcontroller which monitors a quantity of energy stored by the energy storage circuit. The microcontroller is programmed to delay or slow down an operation of at least one predetermined type of command when a level of energy stored by the energy storage circuit is insufficient to immediately perform the operation at a regular rate.

DETAILED DESCRIPTION OF THE PREFERRED EMBODIMENT

The present invention relates to a system for managing power for an external storage device, such as an optical disk drive. The optical disk drive may, for example, be a CD-ROM (read-only memory) drive, a CD-R (read) drive, a CD-RW (read and write) drive or a DVD drive (either read-only or read/write). The description below describes a preferred embodiment of the present invention. The present invention may be applied to other types of external storage devices, including magnetic disk drives.

Figure 1A:
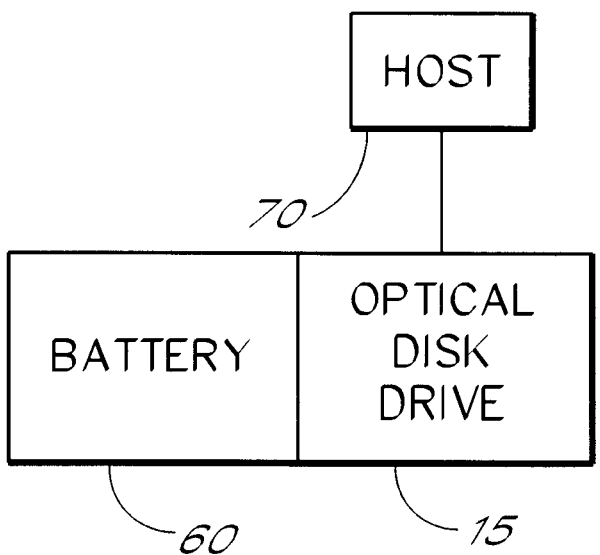
FIG. 1A is a block diagram of a host computer, a battery and an optical disk drive.

FIG. 1A is a block diagram of a host computer 70, such as a personal computer (PC), an external optical disk drive (optical drive or disk drive) 15, and a battery 60 attached to or housed within the disk drive 15. Alternatively, the battery supply 60 may be electrically coupled with the optical drive 15 via a power line but may not be physically attached to the optical drive 15. The battery 60 may be a standard battery or set of batteries known by one of ordinary skill in the art to be associated with an optical disk drive 15.

Figure 1B:
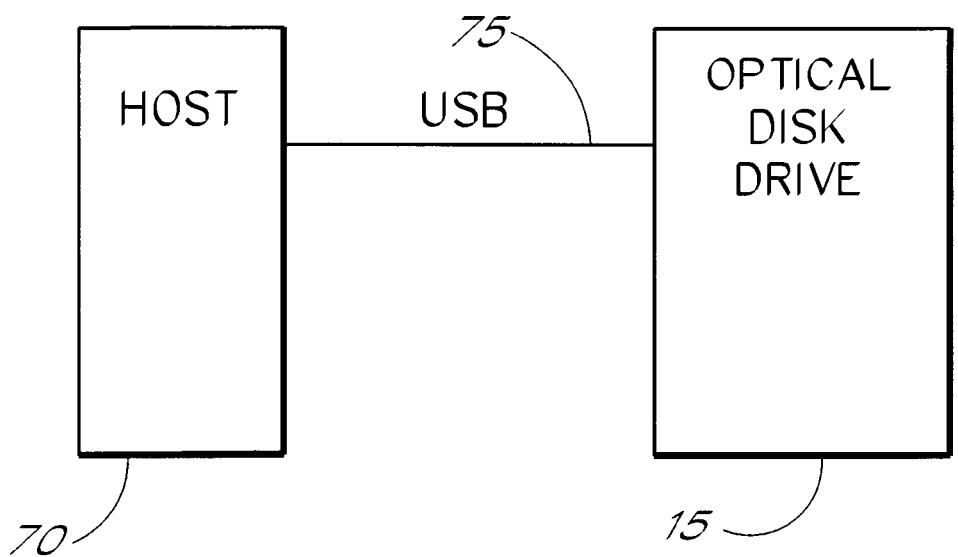
FIG. 1B is a block diagram of a host computer, a universal serial bus (USB) cable and an optical disk drive.

FIG. 1B is a block diagram of a host computer 70, a universal serial bus (USB) cable 75 and an external optical drive 15. The USB bus cable 75 forms part of a USB bus, which also includes USB interface circuitry (not shown) in both the host computer 70 and the optical disk drive 15. In FIG. 1A, the battery 60 supplies power to the optical drive 15. In FIG. 1B, the USB cable 75 transfers data between the optical drive 15 and the host computer 70, and one or more lines of the USB cable 75 is dedicated to transfer current to the optical drive 15 from the host computer 70. For example, in one configuration, the USB cable 75 transfers about 5 volts at a maximum of about 500 milliAmps of power to the disk drive 15.

Figure 2:
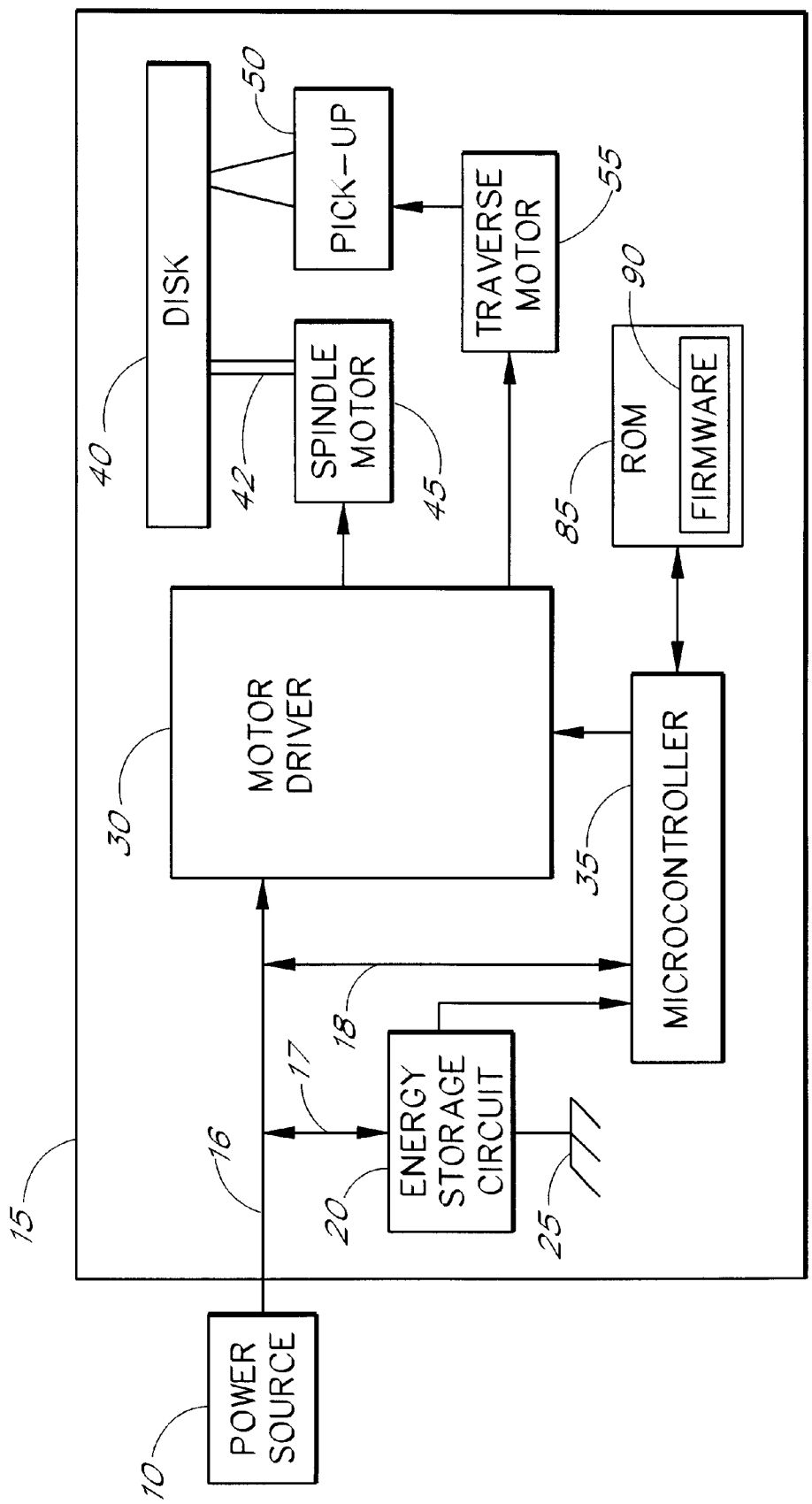
FIG. 2 is a block diagram of a power source and a optical disk drive.

FIG. 2 is a block diagram of a power source 10 and an optical disk drive 15 in accordance with the present invention. The optical disk drive 15 comprises an energy storage circuit 20, a ground connection 25, a motor driver 30, a microprocessor or microcontroller 35, a spindle 42, a spindle motor 45, an optical pick-up 50, a feed motor or traverse motor 55, and a read-only memory (ROM) 85 which stores a firmware program 90. The disk drive 15 reads data from and/or writes data to an optical disk 40.

In FIG. 2, the power source 10 is connected to the motor driver 30 of the disk drive 15 by one or more power lines 16. The power source 10 may be the host computer 70 of FIG. 1B, which transfers power via the USB cable 75. In this case, the power lines 16 comprise the power signal conductors of the USB cable 75. Alternatively, the power source 10 may be a battery 60 attached to the disk drive 15, as shown in FIG. 1A. In FIG. 2, the microcontroller 35 is preferably an existing microcontroller (or microprocessor) within the disk drive 15 and performs other operations in addition to power management. The motor driver 30 may also be a standard component in existing optical disk drives.

Figure 3:
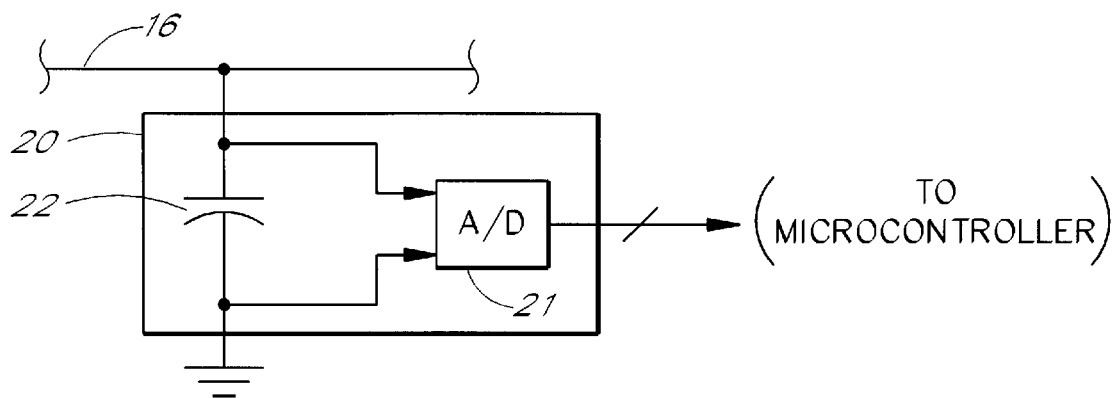
FIG. 3 is a diagram of one configuration of an energy storage circuit within the disk drive of FIG. 2.
Figure 4:
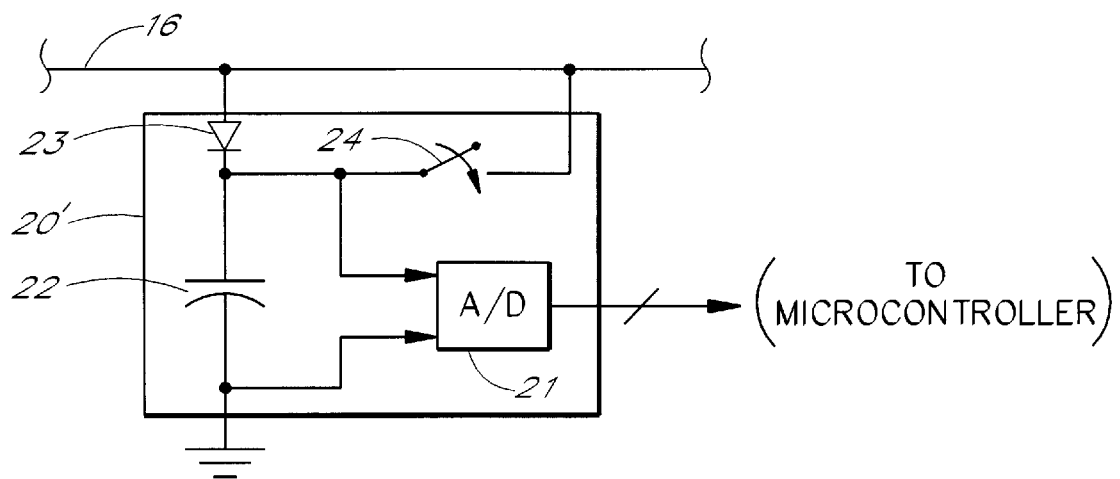
FIG. 4 is a diagram of another configuration of an energy storage circuit within the disk drive of FIG. 2.

In FIG. 2, the energy storage circuit 20 may comprise a variety of different components. FIG. 3 is a diagram of one configuration of the energy storage circuit 20 within the disk drive 15 of FIG. 2. In FIG. 3, the energy storage circuit 20 comprises a capacitor 22, and an analog-to-digital (A/D) converter 21 which is connected to the capacitor 22 so as to measure voltage across the capacitor 22. The A/D converter 21 outputs a digital value to the microcontroller 35 which indicates the level of charge stored in the capacitor 22. Other components may be used in addition to or instead of the capacitor 22 and the A/D converter 21. For instance, the capacitor 22 could be replaced with a plurality of capacitors connected in parallel (not shown), and the A/D converter 21 could be replaced with another type of voltage or charge measuring circuit FIG. 4 is a diagram of another configuration of an energy storage circuit 20' within the disk drive 15 of FIG. 2. In FIG. 4, the energy storage circuit 20' comprises a capacitor 22, a diode 23, a microcontroller-controlled switch 24, and an A/D converter 21 which is connected to the capacitor 22 so as to measure voltage across the capacitor 22.

In general operation, the host computer 70 of FIGS. 1A and 1B sends read and/or write commands to the optical disk drive 15. In FIG. 2, the power source 10 supplies power to the motor driver 30 and the energy storage circuit 20, 20' of the disk drive 15. The motor driver 30 drives the spindle motor 45 and the traverse motor 55. The spindle motor 45 and the traverse motor 55 consume power while the disk drive 15 operates. Specifically, the spindle motor 45 controls the rotation of the optical disk 40 via the spindle 42. The traverse motor 55 controls the operation or movement of the optical pick-up 50. The pick-up 50 records and/or reproduces information on the disk 40 by illuminating a laser beam onto a desired track of the disk 40.

The specific operation of the energy storage circuit 20, 20' and the microcontroller 35 is described with reference to FIGS. 1A–5. In FIG. 2, the energy storage circuit 20, 20' stores energy (charge) received from the power source 10 as the power source 10 supplies power to the motor driver 30. The energy storage circuit 20, 20' may receive current when the disk drive 15 is idle or when the disk drive 15 requires below-peak power from the power source 10.

The power source 10 acts as a main power source to the motor driver 30, and the energy storage circuit 20, 20' acts as a back-up or supplemental power source. The energy storage circuit 20, 20' provides additional power to the motor driver 30 because the power source 10, such as a USB bus 70 (FIG. 1B), may be unable to provide sufficient power to the motor driver 30 to properly execute particular commands. For example, the USB bus 70 may only supply 500 milliAmps, but the spindle motor 45 and/or the traverse motor 55 may require 1 Amp to properly execute a particular command. Different disk drive commands may require different amounts of power for the spindle motor 45 and the traverse motor 55. The spindle motor 45 and/or the traverse motor 55 typically require a relatively large surge of power to perform particular commands, such as seek, read, spin up or spin down.

In FIG. 3, the energy storage circuit 20 automatically supplements the power to the motor driver 30 from the power source 10 by virtue of a direct connection to the power line 16 (FIG. 2) within the disk drive 15.

Alternatively, as shown in FIG. 4, the energy storage circuit 20' has a switch 24, which is controlled by the microcontroller 35 of FIG. 2. The switch 24 is in an open position (as shown in FIG. 4) until the microcontroller 35 closes the switch 24 to supplement the power source 10. The microcontroller 35 monitors the commands being received from the host 70 to determine whether supplemental power is needed, i.e., the power supplied by the power source 10 is not sufficient, to execute a particular host command at a particular time. If supplemental power is needed, the microcontroller 35 checks the capacitor 22 to determine whether the capacitor 22 can provide sufficient supplemental power. If the capacitor 22 can provide sufficient supplemental power, the microcontroller 35 connects an output of the energy storage circuit 20' to the power line 16 via the microcontrolled-switch 24. Thus, in the energy storage circuit 20' of FIG. 4, the microcontroller 35 selectively gates the supplemental power to the motor driver 30. If the capacitor 22 cannot provide sufficient supplemental power, then the microcontroller 35 enters a reduced power execution mode as described below.

With the energy storage circuit 20' of FIG. 4, the microcontroller 35 monitors the power provided by the power source 10 via line 18, in addition to monitoring the voltage across the capacitor 22. For example, if a battery 60 (FIG. 1A) is used as the power source 10 in FIG. 2, the A/D converter 21 or a dedicated A/D converter (not shown) may be used by the microcontroller 35 to measure the state of the battery 60. Alternatively, the microcontroller 35 has access to a predetermined power level or range for a particular power source 10. The predetermined power level or range could be a value stored in the ROM 85 (FIG. 2) or a random access memory (not shown) in the disk drive 15.

For both configurations of the energy storage circuit 20, 20' shown in FIGS. 3 and 4, the microcontroller 35 monitors the amount of energy stored in the energy storage circuit 20, 20'. Specifically, the microcontroller 35 measures the voltage across the capacitor 21, at discrete times when the microcontroller 35 receives a command from the host computer 70. Alternatively, the microcontroller 35 may measure the amount of energy in the energy storage circuit 20, 20' continuously.

Figure 5:
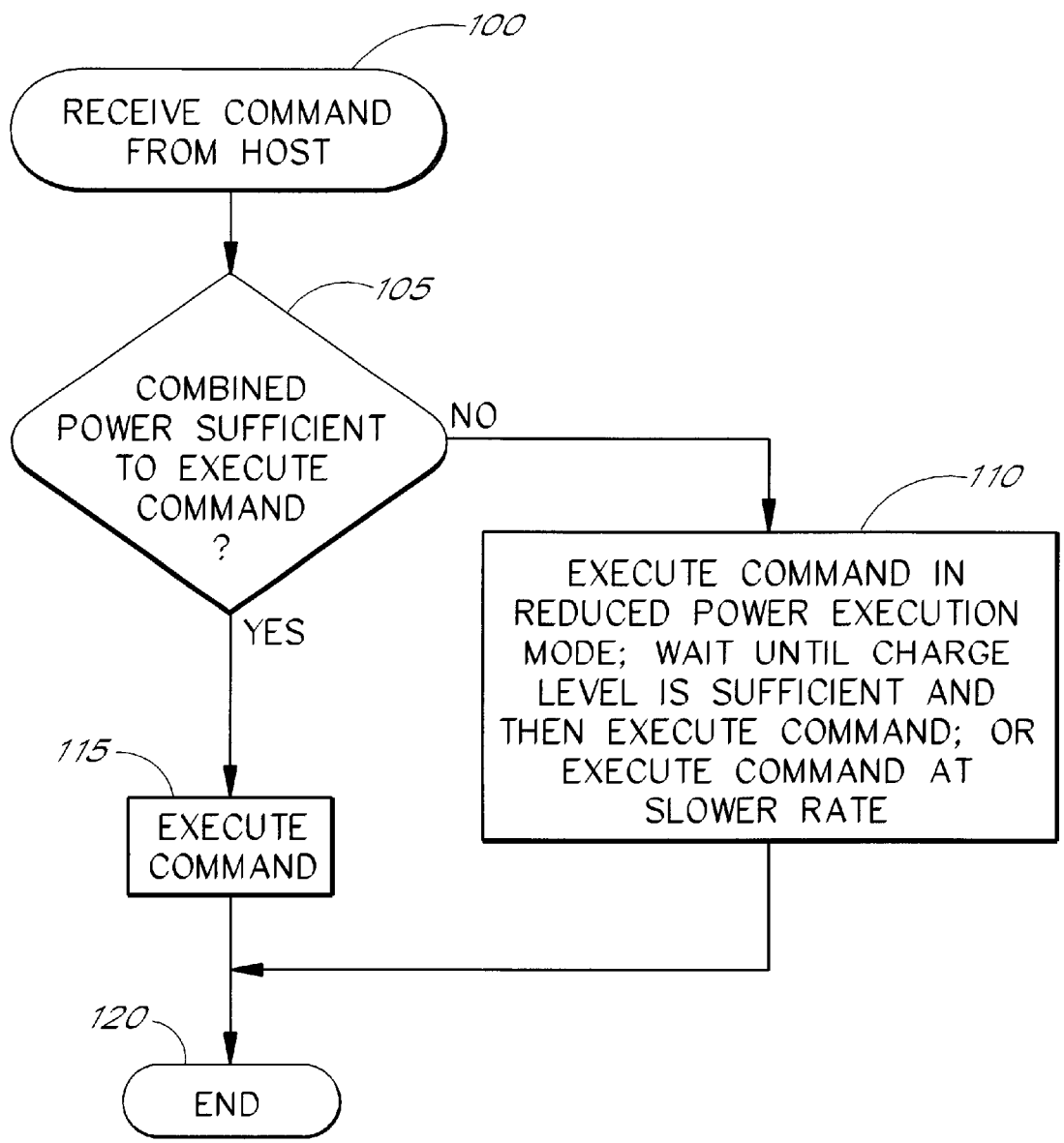
FIG. 5 is a flow chart of one configuration of a method performed by the disk drive of FIG. 2.

FIG. 5 is a flow chart of one embodiment of a method performed by the disk drive 15 of FIG. 2. The method is preferably implemented using the firmware program 90, but may alternatively be performed by a state machine circuit (not shown). In a start block 100, the microcontroller 35 receives a command, such as seek, read, spin up or spin down, from the host computer 70 (FIGS. 1A–1B). As described above with reference to FIG. 4, the microcontroller 35 may first determine whether the power source 10 can provide sufficient power. In a decision block 105, the microcontroller 35 determines whether there is sufficient combined power from the power source 10 and the energy storage circuit 20, 20' at that time to properly execute the particular command. As stated above, different commands may require different amounts of power. A look-up table of various commands and the power levels required to perform the commands may be stored in the ROM 85 of FIG. 2 and used by the microcontroller 35.

If there is sufficient power to perform the particular command at that time, then the microcontroller 35 causes the motor driver 30 to execute the command, as shown in a process block 115. In an end block 120, the microcontroller 35 ends the method of FIG. 5 and waits for another command from the host computer 70.

If there is insufficient power to perform the particular command at the particular time, then the microcontroller 35 enters into a reduced power execution mode. In the reduced power execution mode, the microcontroller 35 may do one of two things, as shown in a process block 110. First, the microcontroller 35 may suspend or postpone the command until a time when the energy storage circuit 20, 20' has stored sufficient energy to execute the particular command. For example, the command may be suspended by 200 or 300 milliseconds. Preferably, the host computer 70 of FIGS. 1A–1B is unaware of a suspended command and continues with its tasks as if the disk drive 15 is processing or has processed the command. When the energy storage circuit 20, 20' has stored sufficient energy, the microcontroller 35 causes the motor driver 30 to execute the command. In the FIG. 4 embodiment, this involves temporarily closing the switch 24.

Second, as shown in the process block 110, the microcontroller 35 may cause the motor driver 30 to execute the command at a slower rate, in comparison to a normal rate when the power source 10 and the energy storage circuit 20, 20' have sufficient power for the motor driver 30 to execute a particular command. For example, the microcontroller 35 may cause the motor driver 30 to execute a 'slow seek' command instead of a seek command at its normal rate of execution.

Either or both of the methods in block 110 of FIG. 5 may be implemented within the same disk drive 15. Specifically, in one embodiment, when the combined power is insufficient (block 105, FIG. 5), the reduced power execution mode only involves the microcontroller 35 suspending a host command until there is sufficient energy stored in the energy storage circuit 20, 20' to execute the command and then executes the command. In another embodiment, the power execution mode only involves the microcontroller 35 executing the host command at a relatively slower rate. In a third embodiment, the reduced power execution mode involves a selection of either suspending the host command or executing the command at a slower rate.

In this manner, the microcontroller 35 acts as an arbitrator or gate mechanism which selectively allows particular commands to be executed at particular times when there is sufficient power to properly execute the commands.

While embodiments and applications of this invention have been shown and described, it will be apparent to those skilled in the art that various modifications are possible without departing from the scope of the invention. It is, therefore, to be understood that within the scope of the appended claims, this invention may be practiced otherwise than as specifically described.

What is claimed is:

1. An external storage device in communication with a host computer and a power source, said power source providing power to a motor driver within the external storage device, said external storage device comprising:

an energy storage circuit coupled to a line between the power source and the motor driver, said energy storage circuit storing energy from the power source and providing supplemental power to the motor driver; and a microcontroller determining whether the power source and the energy storage circuit can provide sufficient power for the external storage device to properly execute a particular command received by the external storage device from the host computer, said microcontroller performing an operation according to a reduced power execution mode if the power from the power source and the energy storage circuit is insufficient for the external storage device to properly execute a particular command received from the host computer.

2. The external storage device of claim 1, wherein the external storage device comprises an optical disk drive.

3. The external storage device of claim 2, wherein the external storage device comprises a CD-R drive.

4. The external storage device of claim 2, wherein the external storage device comprises a CD-RW drive.

5. The external storage device of claim 1, wherein the external storage device comprises a CD-ROM drive.

6. The external storage device of claim 1, wherein the energy storage circuit comprises at least one capacitor.

7. The external storage device of claim 1, wherein the external storage device further comprises a spindle motor and a traverse motor which are driven by the motor driver.

8. The external storage device of claim 1, wherein the power source comprises the host computer supplying power to the external storage device across a universal serial bus (USB) cable, said USB bus cable transferring data between the host computer and the external storage device and providing power from the host computer to the external storage device.

9. The external storage device of claim 1, wherein the power source comprises a battery coupled to the external storage device.

10. The external storage device of claim 1, wherein particular commands from the host computer require a surge of power for the external storage device to execute a command properly.

11. The external storage device of claim 10, wherein one of said particular commands comprises a seek command.

12. The external storage device of claim 10, wherein one of said particular commands comprises a read command.

13. The external storage device of claim 10, wherein one of said particular commands comprises a spin up command.

14. The external storage device of claim 10, wherein one of said particular commands comprises a spin down command.

15. The external storage device of claim 1, wherein the energy storage circuit automatically supplements the power from the power source to the motor driver when the power from the power source is insufficient for the external storage device to execute a particular command received from the host computer.

16. The external storage device of claim 1, wherein the energy storage circuit supplements the power from the power source to the motor driver when the microcontroller determines that the power from the power source is insufficient for the external storage device to execute a particular command received from the host computer.

17. The external storage device of claim 1, wherein the operation according to the reduced power execution mode comprises executing the command at a rate slower than a normal rate in which there is sufficient power from the power source and the energy storage circuit.

18. The external storage device of claim 1, wherein the operation according to the reduced power execution mode comprises selectively performing a first operation or a second operation, said first operation comprising suspending the command until the energy storage circuit has stored sufficient energy for the external storage device to execute the command and executing the command, said second operation comprising executing the command at a rate slower than a normal rate in which there is sufficient power from the power source and the energy storage circuit.

19. An external storage device in communication with a host computer and a power source, said power source providing power to a motor driver within the external storage device, said external storage device comprising:

an energy storage circuit coupled to a line between the power source and the motor driver, said energy storage circuit storing energy from the power source and providing supplemental power to the motor driver; and a microcontroller determining whether the power source and the energy storage circuit can provide sufficient power for the external storage device to properly execute a particular command received by the external storage device from the host computer, said microcontroller performing an operation according to a reduced power execution mode if the power from the power source and the energy storage circuit is insufficient for the external storage device to properly execute a particular command received from the host computer;

wherein the energy storage circuit comprises at least one capacitor and the energy storage circuit further comprises an analog-to-digital converter.

20. An external storage device in communication with a host computer and a power source, said power source providing power to a motor driver within the external storage device, said external storage device comprising:

an energy storage circuit coupled to a line between the power source and the motor driver, said energy storage circuit storing energy from the power source and providing supplemental power to the motor driver; and a microcontroller determining whether the power source and the energy storage circuit can provide sufficient power for the external storage device to properly execute a particular command received by the external storage device from the host computer, said microcontroller performing an operation according to a reduced power execution mode if the power from the power source and the energy storage circuit is insufficient for the external storage device to properly execute a particular command received from the host computer;

wherein the operation according to the reduced power execution mode comprises suspending the command until the energy storage circuit has stored sufficient energy for the external storage device to execute the command and executing the command.

21. A method of managing power in an external storage device, comprising:

storing energy from a power source in an energy storage circuit within the external storage device;

monitoring the amount of energy in the energy storage circuit when the external storage device receives a command from a host computer; and based on said act of monitoring, performing an operation according to a reduced power execution mode when a combined power from the power source and the energy storage circuit is insufficient for the external storage device to properly execute a particular command from the host computer.

22. The method of claim 21, wherein the operation according to the reduced power execution mode comprises executing the command at a rate slower than a normal rate in which there is sufficient power from the power source and the energy storage circuit.

23. The method of claim 21, wherein the operation according to the reduced power execution mode comprises selectively performing a first operation or a second operation, said first operation comprising suspending the command until the energy storage circuit has stored sufficient energy for the external storage device to execute the command and executing the command, said second operation comprising executing the command at a rate slower than a normal rate in which there is sufficient power from the power source and the energy storage circuit.

24. A method of managing power in an external storage device, comprising:

storing energy from a power source in an energy storage circuit within the external storage device;

monitoring the amount of energy in the energy storage circuit when the external storage device receives a command from a host computer; and based on said act of monitoring, performing an operation according to a reduced power execution mode when a combined power from the power source and the energy storage circuit is insufficient for the external storage device to properly execute a particular command from the host computer;

wherein the operation according to the reduced power execution mode comprises suspending the command until the energy storage circuit has stored sufficient energy for the external storage device to execute the command and executing the command.

25. An external storage drive for use with a computer, comprising:

at least one motor which receives power from a primary power source over a power supply line;

an energy storage circuit which receives energy from the primary power source and stores the energy to provide supplemental power to the at least one motor; and a microcontroller which monitors a quantity of energy stored by the energy storage circuit and provided by the primary power source, the microcontroller programmed to delay or slow down an operation of at least one predetermined type when a combined energy from the energy storage circuit and the primary power source is insufficient to immediately perform the operation at a regular rate.

26. The external storage drive of claim 25, wherein the power supply line comprises a conductor of a USB cable.

27. The external storage drive of claim 25, wherein the energy storage circuit includes a switch which is selectively activated by the microcontroller to provide supplemental power to the at least one motor.

28. An external storage drive for use with a computer, comprising:

at least one motor which receives power from a primary power source over a power supply line;

an energy storage circuit which receives energy from the primary power source and stores the energy to provide supplemental power to the at least one motor;

a microcontroller which monitors a quantity of energy stored by the energy storage circuit, the microcontroller programmed to delay or slow down an operation of at least one predetermined type when a level of energy stored by the energy storage circuit is insufficient to immediately perform the operation at a regular rate;

wherein the energy storage circuit comprises a capacitor and an analog-to-digital converter which generates a digital signal which represents a level of energy stored by the energy storage circuit.

* * * * *